United States Patent [19]
Epelbaum

[11] 3,829,113
[45] Aug. 13, 1974

[54] ADAPTER FOR CONVERTIBLE CAR SEAT AND STROLLER

[76] Inventor: Quido C. Epelbaum, 5472 Walshire Dr., Columbus, Ohio 43227

[22] Filed: Oct. 27, 1972

[21] Appl. No.: 301,306

[52] U.S. Cl............. 280/30, 280/47.25, 280/47.34, 297/254
[51] Int. Cl............................................. B62b 1/04
[58] Field of Search ... 280/30, 414 A, 47.38, 47.37, 280/36 C, 47.25; 297/254, 250

[56] References Cited
UNITED STATES PATENTS

| | | |
|---|---|---|
| 2,481,382 | 9/1949 | Bennett............................ 280/30 |
| 2,593,962 | 4/1952 | Barker.............................. 280/30 |
| 2,846,233 | 8/1958 | Burg................................. 280/30 |
| 3,116,069 | 12/1963 | Dostal.............................. 280/30 |
| 3,290,050 | 12/1966 | Ezquerra.......................... 280/30 |
| 3,616,474 | 11/1971 | Lindblad...................... 280/414 A |

*Primary Examiner*—Robert R. Song

[57] ABSTRACT

A convertible child car seat and stroller apparatus adapted to easily and simply convert most presently available types of child car seats into a stroller assembly and back to a car seat as described with a minimum of effort.

7 Claims, 5 Drawing Figures

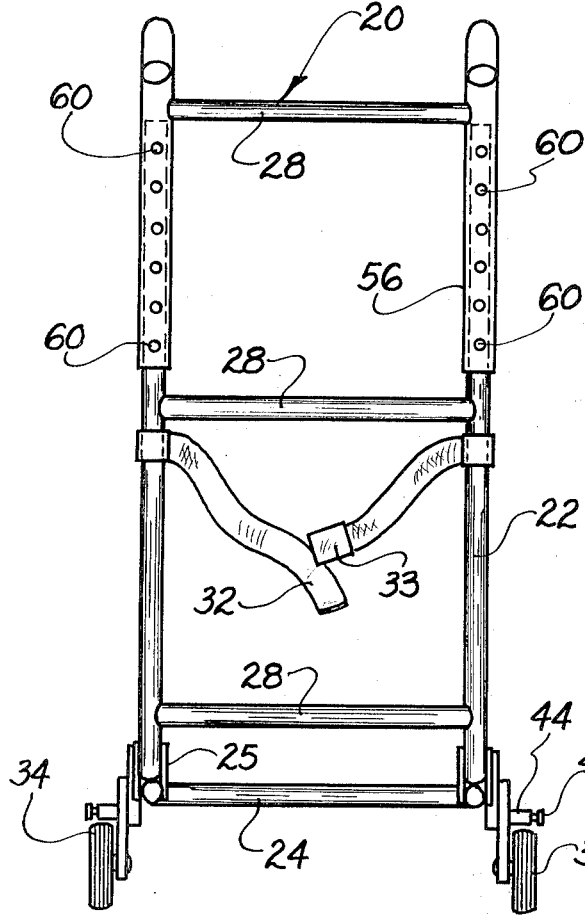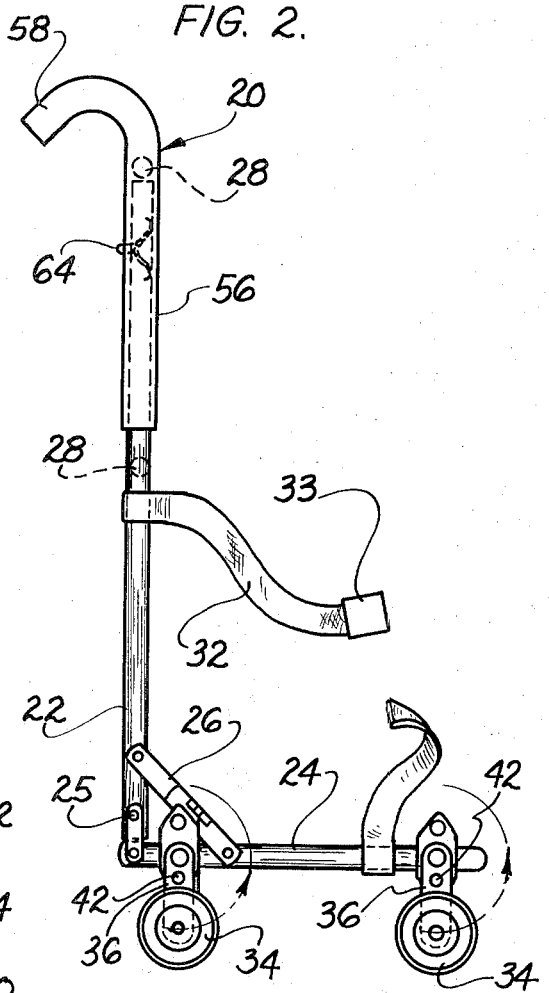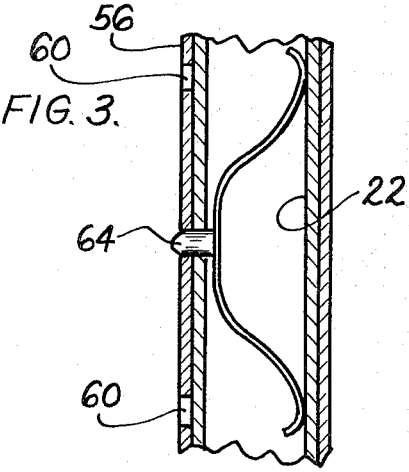

ADAPTER FOR CONVERTIBLE CAR SEAT AND STROLLER

BACKGROUND

With the increase of the ownership of automobiles and the resulting increase in "two car" families, a tremendous growth in the sales of child car seats has occurred over the last two decades. This trend and the increase in safety features in automobiles within government regulations has also brought about an increasing awareness and resulting regulations governing child seats of the type which are removably fastened to the back portion of the seats in the auto.

Within the government safety regulations, many various types of child car seat designs are available.

The increasing local travel of parents in and about the surburbs on errands and the like and the fact that their young children usually accompany them, has brought forth the need for safe, convenient transportation for these toddlers in and out of the automobile. Therefore in addition to the child car seat which safely seats the child in the car, a corresponding increase in the number of baby stroller units has occurred so that the toddler can be conveniently transported by the parents while shopping and the like.

One of the problems in this area is the inconvenience of removing the child from the car seat and then opening the trunk of the auto to retrieve the stroller at every stop the parent makes while shopping. Most strollers fold up in one way or the other for storage purposes which necessitates the unfolding and folding of the stroller each time it is to be used.

Further, there is a duplicate of expense involved in the sense that both the car seat and the stroller have structure upon which the child sits.

Among other advantages, the present invention eliminates the need to obtain a stroller from a storage place and reduces an expense incident with the above-mentioned purchase of a baby stroller.

SUMMARY OF INVENTION

The present invention relates generally to a converter apparatus adapted to convert most conventional child car seats into a stroller apparatus and which is easily reconvertible into the car seat again with a minimum of effort by the user. The converter apparatus comprises a simple, but sturdily constructed frame adapted to removably receive a conventional child car seat in a secure manner. The frame includes an adjustable handle means for use in the stroller configuration. Wheel means are provided for use in the stroller configuration and are constructed to be easily and simply moved to a non-conflicting position in the car seat configuration.

OBJECTS

It is a primary object of the present invention to provide an apparatus which easily and simply converts a conventional child car seat to a stroller and may be reconverted back to the car seat again as the situations requires.

It is another object of the present invention to provide an apparatus of the type described which is of simple yet durable construction and which operates in a simple and easy manner.

It is another object of the present invention to provide an apparatus of the type described which eliminates the need of a relatively much more expensive independent baby stroller unit for those persons having child car seats or about to purchase such seats without sacrificing any of the other useful purposes and conveniences of such an unit.

It is a further object of the present invention to provide an apparatus of the type described which is readily adapted to a variety of child car seat designs presently being manufactured.

Further objects and advantages of the present invention will be apparent from the following description, reference being had to the accompanying drawings wherein a preferred form of embodiment of the invention is clearly shown.

IN THE DRAWINGS

FIG. 1 is a front elevational view of the adapter apparatus for converting a childrens car seat to a baby stroller and constructed in accordance with the present invention;

FIG. 2 is a side elevational view of the apparatus shown in FIG. 1;

FIG. 3 is a partial side elevational view in section of a portion of the apparatus shown in FIG. 2 illustrating the adjustable handle portion;

FIG. 4 is a partial front elevational view partially in section of the apparatus shown in FIG. 1 illustrating a pivotally mounted wheel forming a portion of the present invention.

DETAILED DESCRIPTION

Figure 5:
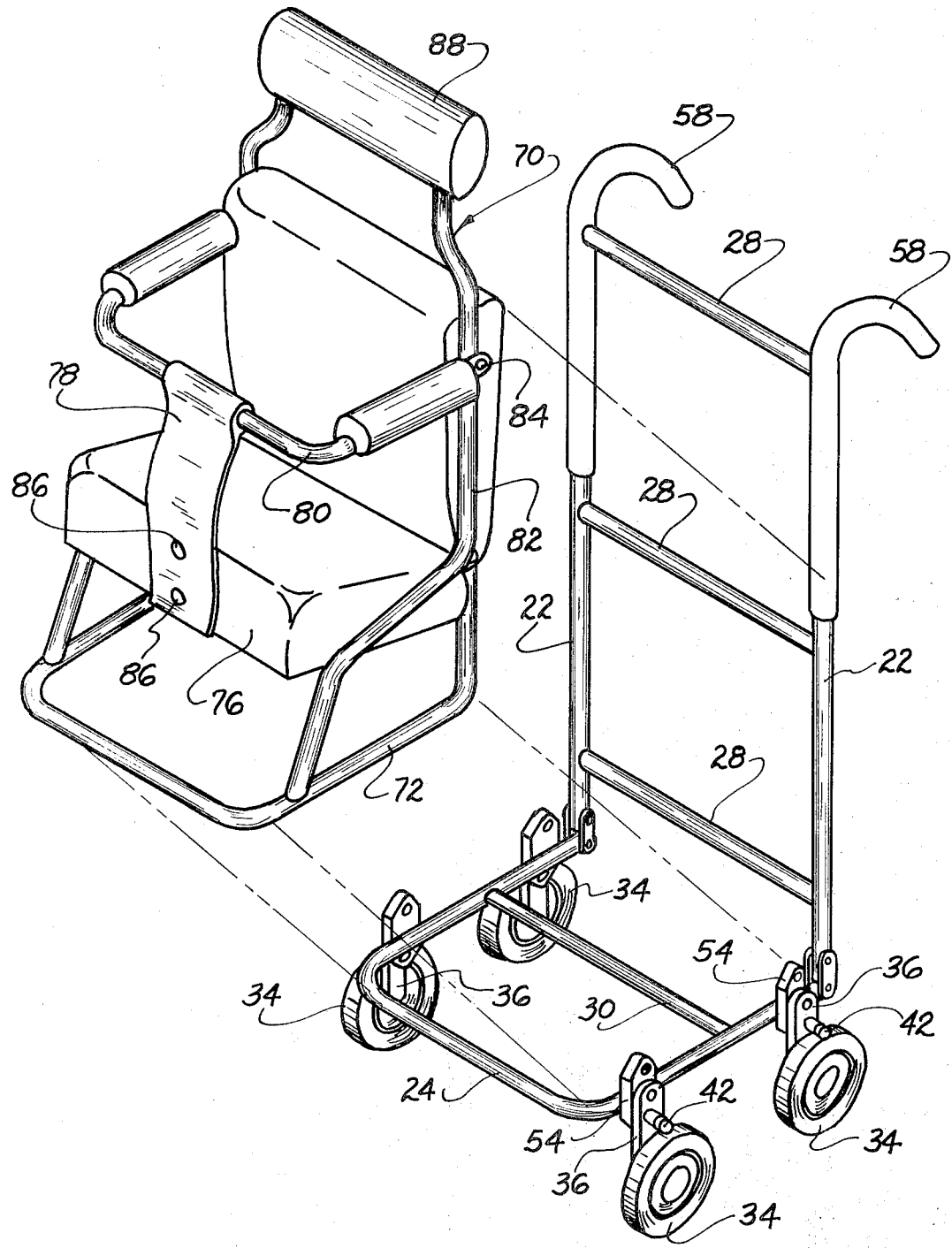
FIG. 5 is an exploded perspective view of the apparatus of the present invention illustrating both the childrens car seat and adapter portions and illustrating the removably mounted relationship between each portion.

An adapter apparatus indicated generally at 20, for a combination child seat and stroller constructed in accordance with the present invention is illustrated in FIG. 1 and includes a generally L-shaped frame means which comprises upright frame members 22 and a horizontal frame member or base means 24.

Frame members 22 are pivotally connected to the rear portion of base means 24 as at 25 and fixed in the upright position as seen in FIG. 1 by foldable link members 26.

Frame members 22 are provided with fixed cross support members 28 and horizontal base means 24 includes fixed support members 30 which function to support a child car seat as described in detail later herein.

A plurality of fastening means in the form of straps 32 provided with buckles 33 fixedly connected at one end to respective frame members 22 and 24 are provided to removably fasten a child car seat to the adapter frame 20 as shown in FIG. 5.

Frame means 24 also includes two pair of wheels 34 which are rotatably mounted to struts 36. As best seen in FIG. 4 struts 36 are in turn pivotally mounted to a frame member 24 by means of pivot pin 38 and removably locked in either a lowered position as shown in FIG. 2 or a raised position as indicated in FIG. 2 by the dotted lines by a spring biased lock pin 40.

Pin 40 includes an outer head 42 which extends outwardly of a housing portion 44 in which spring 46 is mounted between one end of housing 44 and an enlarged portion pin 40 to bias pin 40 such that the inner end 45 extends inwardly through a hole 48 provided in strut 36 and one of two locking holes 50 and 52 provided in a bracket 54. Bracket 54 is fixedly attached in any suitable manner, such as welding for example, to frame member 24.

Pulling head 42 and pin 40 outwardly and then pivoting strut 36 and wheel 34 permits the wheel 34 to be raised or lowered as desired. In the raise position, release of pin 42 against the bias spring 46 permits the pin 40 to extend into locking hole 50. The lowered position is obtained in the same manner, when strut 36 is provided to align pin 40 with locking hole 52.

The upright frame members 22 include a telescopic upper portion 56 provided with turned end portions 58 which serve as handles when the apparatus is used in the stroller configuration.

Upper portion 56 is slideably mounted over portion 22 and is provided with spaced holes 60 which are adapted to receive a spring biased button 64 disposed within the tubular frame portion 22. As best seen in FIG. 3 button 64 extends outwardly through a hole provided in tubular portion 22 and functions to releasably lock upper portion 56 in a position dictated by the spacing of holes 60. To change the height of handles 58, button 64 is manually depressed and portion 56 is slideably moved to the next hole 60.

In operation, the user merely fixes the car seat portion, indicated generally at 70 in FIG. 5, to the adapter apparatus 20 by means of straps 32.

The base 72 of car seat 70, which is of generally conventional construction, rests on the base means 24 and the back portion 74 of car seat 70 rests against the upright frame portion 22 and cross support members 28.

Car seat 70 incudes in addition to the conventionally padded back test 74, a padded seat portion 76 and retaining strap 78 fixed forwardly between seat portion 76 and restraining bar 80. Bar 80 is conventionally pivotally mounted to side frame 82 so at 84 and retaining strap is conventionally removably fastened to the seat portion or the bar such as by snaps 86.

A padded head rest 88 is included as an essential safety feature.

With the handle 58 in a lowered configuration and the wheels 34 in the raised position, the apparatus assumes a conventional car seat configuration and is disposed in the car in the conventional manner utilizing the seat belts of the car around the child to securely hold the child in a safe position.

When the user reaches a destination where the child is to be taken along with the user, the car seat belts are unloosened, the apparatus is removed from the car, wheel 34 are lowered in the manner described, and the handles 58 are raised to a comfortable position. In this configuration, the apparatus quickly and easily assumes the stroller configuration.

Upon returning to the car, the handles 58 are lowered as previously described and wheels 34 are raised, and the apparatus is placed in the car in the car seat configuration.

From the foregoing description, it should be readily understood, that the combination car seat and stroller is not only more convenient than having two separate devices for this purpose, but also is much less expensive to the potential user than buying a separate stroller which cannot be as conveniently stored in the car and is not as conveniently made ready for use as the adapter converter apparatus of the present invention.

What is claimed is:

1. A combination childrens car seat and stroller apparatus convertibly adapted to serve as one or the other comprising, in combination, a generally L-shaped frame means including an upright back portion connected to a horizontally disposed base means which is adapted to rest substantially flush with the horizontal portion of an auto seat, said upright portion provided with an adjustable handle portion; wheel means operatively mounted to said base means between raised and lowered positions; a car seat portion conventionally adapted to receive a child in a safe sitting disposition and including an upright back portion engaging said upright back portion of said frame means and a base portion engaging said base means of said frame portion; and means for releasably fixing said respective back portions and said respective base portions to one another.

2. The apparatus defined in claim 1 wherein said upright back portion of said frame means is pivotally mounted to said horizontally disposed base means.

3. The apparatus defined in claim 1 wherein said wheel means are pivotally connected to said base means of said frame means between releasably fixed raised and lowered positions defining a car seat configuration and a stroller configuration respectively.

4. The apparatus defined in claim 3 wherein said wheel means are rotatably mounted to a strut portion and said strut portion is pivotally mounted to said base means; and including a locking pin assembly mounted to said strut portion and having a pin slideably mounted through said strut and alternately engagably with one of a pair of locking holes provided in a bracket member fixed to said base means of said frame, said locking pin being biased inwardly to extend into said locking holes when aligned therewith.

5. An apparatus for adapting a conventional children's car seat into a baby stroller comprising, in combination, a generally L-shaped frame including an upright back portion and a horizontally disposed base means; said back portion including variable length handle means; support members mounted on said frame and adapted to receive the respective back portion and base portion of said car seat in engaging and supporting disposition; fastening means connected to said frame for removably fixing said car seat to said frame means; and wheel means mounted on said base means of said frame.

6. The apparatus defined in claim 5 wherein said back portion of said frame is pivotally connected to said base means between releasably locked open and folded positions.

7. The apparatus defined in claim 5 wherein said wheel means are pivotally mounted to said base means between releasably fixed raised and lowered positions.

* * * * *